United States Patent [19]

Iizuka et al.

[11] Patent Number: 4,547,257
[45] Date of Patent: Oct. 15, 1985

[54] METHOD FOR GROWING DIAMOND CRYSTALS

[75] Inventors: Eiichi Iizuka; Tomoji Sando; Shinji Kashima, all of Shiojiri, Japan

[73] Assignee: Showa Denko Kabushiki Kaisha, Tokyo, Japan

[21] Appl. No.: 654,295

[22] Filed: Sep. 25, 1984

[51] Int. Cl.$^4$ ............................................. C30B 29/04
[52] U.S. Cl. ............................ 156/603; 156/DIG. 68; 156/DIG. 98; 423/446
[58] Field of Search ....... 156/603, DIG. 68, DIG. 98; 423/446

[56] References Cited

U.S. PATENT DOCUMENTS

| | | | |
|---|---|---|---|
| 2,992,900 | 7/1961 | Bovenkerk | 423/446 |
| 3,423,177 | 1/1969 | Bovenkerk | 156/603 |
| 4,034,066 | 7/1977 | Strong et al. | 423/446 |
| 4,147,255 | 4/1979 | Ishizuka | 423/446 |

FOREIGN PATENT DOCUMENTS 1154927 10/1983 Canada .............................. 423/446

*Primary Examiner*—William P. Smith
*Attorney, Agent, or Firm*—Armstrong, Nikaido, Marmelstein & Kubovcik

[57] ABSTRACT

Diamond crystals are grown by subjecting reaction materials of nondiamond carbon, a solvent metal, and diamond seeds to pressure and temperature conditions in the diamond-stable region. The reaction materials are in the form of a pair of a superimposed solvent metal plate and a nondiamond carbon plate or a pile made of a plurality of the pairs of the superimposed solvent metal plate and nondiamond carbon plate, and a plurality of the seeds are disposed on either one or each of the confronting surfaces of the pair of the superimposed solvent metal plate and nondiamond carbon plate. Alternatively, the reaction materials are in the form of a plate made of a mixture of the solvent metal and the nondiamond carbon or a pile made of a plurality of the mixture plates, and a plurality of the seeds are disposed on a surface of each plate. The seeds have a particle size of not larger than 50 $\mu$m and are regularly disposed in such a manner that the seeds are located at a substantially equal distance and the distance between the peripheries of every two adjacent growth diamond crystal particles is from 50 to 300 $\mu$m. The diamond crystals are allowed to grow until their sizes reach at least five times the size of the seeds.

8 Claims, 3 Drawing Figures

4,547,257

METHOD FOR GROWING DIAMOND CRYSTALS

BACKGROUND OF THE INVENTION

(1) Field of the Invention

The present invention relates to a method for synthesizing diamond at a high temperature under a high pressure, wherein diamond crystals are grown by using diamond particles as seeds.

(2) Description of the Prior Art

When diamond is synthesized according to the hydrostatic pressure method, to obtain crystals having a low inclusion content and a good shape, it is important to grow the crystals at temperatures and pressures very close to the phase equilibrium line. Accordingly, the use of diamond particles as seeds is considered effective for controlling the number of nuclei acting as the centers of growth of the crystals.

In synthesizing diamond according to the hydrostatic pressure method, a temperature difference growth method and a film growth method are adopted as means for growing the crystals. According to the former method, a seed and nondiamond carbon such as graphite are made present and a solvent metal having a temperature gradient is interposed therebetween in such a manner that the seed is positioned on the low temperature side of the solvent metal, where a diamond crystal is grown. According to the latter method, nondiamond carbon is dissolved in a thin film of a solvent metal adhering to the periphery of a diamond seed particle and a diamond crystal is grown by utilizing the solubility difference between the nondiamond carbon and the diamond seed particle. In the film growth method, a nucleus may be generated during the synthesis without making the seed present in advance, but if the seed is used, control of the number of nuclei can be easily accomplished. However, even if the number of nuclei can be controlled, when a diamond crystal is grown in a region where the degree of supersaturation of the nondiamond carbon concentration is high, good quality crystals cannot be obtained and the crystal shape is unsatisfactory. Furthermore, the amounts of included impurities such as the solvent metal, nondiamond carbon, and bubbles are increased. In order to reduce the degree of supersaturation, it is necessary to maintain the temperature and pressure conditions in close proximity to the phase equilibrium line on the side of the stable region of the diamond seed particle. However, in an industrial super-high pressure synthesis apparatus, it is very difficult to regularly measure the temperature and pressure in the reaction zone and to control them to the intended values.

A method is known in which a solvent metal and nondiamond carbon are mixed with diamond seeds, the mixture is molded into columns, and the columns are charged in a high pressure apparatus where diamond crystals are grown. However, since it is difficult to disperse the seeds uniformly in the mixture, deviations are readily caused in the growth of the crystals.

A method is also known in which diamond seeds are incorporated into a solvent metal powder and/or nondiamond carbon powder, both the powders are molded into thin sheets, many solvent metal thin sheets and nondiamond carbon thin sheets are laminated alternately, and crystals are grown under predetermined temperature and pressure conditions. However, deviations are readily caused in the growth of the crystals and it is difficult to obtain diamond crystals having a narrow particle size distribution.

Furthermore, there is known a method in which nondiamond carbon is positioned in contiguous relationship to a catalyst metal (i.e., solvent metal), diamond seeds are placed in holes made in the nondiamond carbon rod or disc, and the combination of the nondiamond carbon, the catalyst metal, and the diamond seeds is subjected to pressure and temperature conditions in the diamond-stable region (U.S. Pat. No. 3,423,177). In this method, the diamond seeds are disposed at a relatively large distance between the adjacent seeds. Therefore, deviations are readily caused in the growth of the crystals, it is difficult to control the particle size of the crystals, and the productivity is low. Furthermore, the growth ratio of the crystal as observed during the crystal growth stage is relatively small and the resulting diamond crystals have poor crushing strength and other mechanical strengths.

SUMMARY OF THE INVENTION

Under the above background, it is the primary object of the present invention to provide a method in which diamond crystals having a narrow particle size distribution and high mechanical strengths such as crushing strength can be obtained with a high productivity.

More specifically, in accordance with the present invention, there is provided an improvement in a method for growing diamond crystals which comprises subjecting reaction materials of nondiamond carbon, a solvent metal, and diamond particles as the seeds, to pressure and temperature conditions in the diamond-stable region, wherein the reaction materials are in the form of a pair of a superimposed solvent metal plate and a nondiamond carbon plate or a pile made of a plurality of said pairs of the superimposed solvent metal plate and nondiamond carbon plate, a plurality of the diamond particles being disposed on either one or each of the confronting surfaces of the pair of the superimposed solvent metal plate and nondiamond carbon plate; or the reaction materials are in the form of a plate made of a mixture of the solvent metal and the nondiamond carbon or a pile made of a plurality of the solvent metal/nondiamond carbon mixture plates, a plurality of the diamond particles being disposed on a surface of each solvent metal/nondiamond carbon mixture plate. The improvement comprises regularly disposing diamond particles having a particle size of not larger than 50 $\mu$m in such a manner that the diamond particles are located at a substantially equal distance and the distance between the peripheries of every two adjacent growth diamond crystal particles is in the range of 50 to 300 $\mu$m; and allowing the diamond crystals to grow until their sizes reach at least five times the size of the seed particles.

DESCRIPTION OF THE PREFERRED EMBODIMENTS

Figure 1:
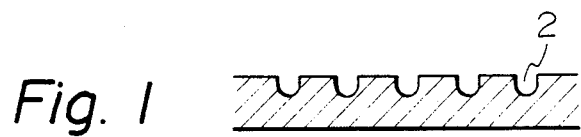
FIG. 1 is a sectional view of part of a plate of a solvent metal, in which a plurality of holes for placing seeds therein are made.

In the method of the present invention, diamond seed particles are regularly disposed on either one or each of a superimposed solvent metal plate and a nondiamond carbon plate, or on a plate of a solvent metal/nondiamond carbon mixture plate, so that the diamond particles are located at a substantially equal distance and the distance between the peripheries of every two adjacent grown diamond crystal particles is with in the predetermined range.

Various methods may be adopted for regularly disposing diamond seed particles. A preferable method comprises placing the diamond seed particles one by one in a plurality of holes made on a plate. The holes may be made on a solvent metal plate, a nondiamond carbon plate or a solvent metal/nondiamond carbon mixture plate by mechanical means such as a small diameter drill. In the case of solvent metal plates, holes can be made by not only mechanical means but also by an etching method including photoetching, a discharge method, or a laser processing method.

The placing of diamond seed particles in the holes may be accomplished by scattering the particles on a plate in which holes are made, and appropriately vibrating the plate. For this placing, it is preferred that the diamond seed particles be covered with an electrically conductive substance, more preferably, plated with a metal. The seed particles are rounded to some extent and made antistatic by the metal plating, whereby they can be readily placed in the holes. The metal used for plating is preferably the same as the solvent metal.

Furthermore, covering of the seed particles with a metal is advantageous in that there is no risk of direct contact of the seed particles with nondiamond carbon under diamond growth conditions, where the seed particles are disposed on a nondiamond carbon plate. The metal used for this purpose may or may not be the same as the solvent metal used.

When bare seed particles are placed in the holes made in the solvent metal plate, it is preferred that the openings of the holes are ordinarily closed by a metal sheet after the disposition of the seed particles.

Through-holes may be formed instead of the above-mentioned holes, but from the viewpoint of handling ease, non-through-holes are preferable to through-holes.

As an alternative to the above-mentioned method, in which holes are made and diamond seed particles are placed therein, a method may be adopted in which diamond seed particles are directly pressed into the plate. In addition, where the plates on which the seed particles are placed are made of a metal, a minor amount of an adhesive material may be spot-coated on the surfaces of the plates, instead of making holes therein, and bare or metal-coated seed particles may be bonded to the surfaces. Thus, the seed-bonded metal plates and nondiamond carbon plates are superimposed alternately to form a pile wherein the seed particles are disposed regularly on the interface between each non-diamond carbon plate and each metal plate. Regular disposition of the seed particles may be accomplished by using a net having appropriate apertures or an electronic part automatic disposition apparatus.

Figure 2:
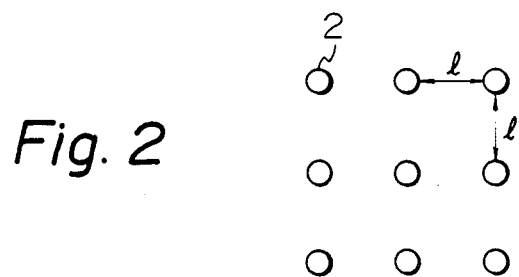
FIG. 2 is a plane view of part of the plate shown in FIG. 1.

FIG. 1 shows the state where a plurality of holes 2 for disposing seed particles therein are made in a solvent metal plate 1. FIG. 2 shows the state where a plurality of holes 2 are regularly disposed in such a manner that distances 1 between the peripheries of every two adjacent holes 2 are substantially equal and in a predetermined range such as will provide a distance of from 50 to 300 μm between the peripheries of every two adjacent grown diamond crystal particles. The disposition of the holes 2 is not limited to the checkered pattern disposition shown in FIG. 2, but any layout pattern may be adopted so far as the distances between every two adjacent holes are substantially equal.

Figure 3:
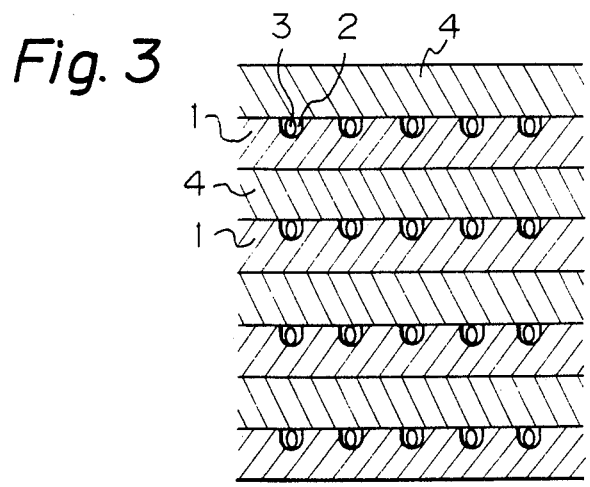
FIG. 3 is a sectional view showing the state where many solvent metal plates shown in FIG. 1 and plates of nondiamond carbon are superimposed alternately.

The solvent metal plate 1 having holes 2, in which diamond seed particles are placed, is superimposed on a nondiamond carbon plate so that the seed particle-disposed surface of the solvent metal plate 1 confronts the nondiamond carbon plate. Such a pair of the superimposed solvent metal plate and the nondiamond carbon plate may be subjected, as is, to pressure and temperature conditions in the diamond-stable region. Alternatively, as shown in FIG. 3, a pile is made of a plurality of such pairs of the superimposed solvent metal plate and the nondiamond carbon plate 4, and the pile is subjected to the desired pressure and temperature conditions in the diamond stable region.

Diamond seed particles may be disposed not on a solvent metal plate but on a nondiamond carbon plate or on both a solvent metal plate and nondiamond carbon plate. Alternatively, the seed particles may be disposed on a plate made by compression-molding a mixture of a solvent metal powder and a nondiamond carbon powder by using, for example, a hot press.

It is essential that diamond seed particles are regularly disposed in such a manner that the seed particles are located at a substantially equal distance and the distance between the peripheries of every two adjacent grown diamond crystal particles is in the range of 50 to 300 μm. If the distance between the peripheries of every two adjacent grown diamond crystal particles is smaller than 50 μm, the adjacent particles interfere with one another in the course of the crystal growth, with the result that the growing diamond crystals adhere to each other or the growth is impeded and the obtained crystals have a broad particle size distribution and poor quality. If the afore said distance exceeds 300 μm, the degree of supersaturation becomes non-uniform and deviations are readily caused in the growth of the crystals, and consequently the diamond crystals tend to have a broad particle size distribution. In addition, productivity is poor.

It is also essential that diamond seed particles having a particle size of not larger than 50 μm are used, and that the diamond crystals are allowed to grow until their sizes (particle diameters) reach at least five times the size (particle diameters) of the seed particles. By using seed particles of such a small particle size, and allowing the diamond crystals to grow at such a high growth ratio, diamond crystals of a high quality, particularly with an enhanced crushing strength and other mechanical strengths, can be obtained. This advantageous result is obtained because when the growth ratio is high, the relative proportion of the area of the interface between the seed particle and the crystal grown on the seed particle to the crystal size is smaller than that in the known method wherein diamond crystals are grown by using diamond seeds and at a low growth ratio. If seed particles having a particle size larger than 50 μm are used, it is difficult to achieve the desired high growth ratio. It is preferable to use seed particles having a particle size of 10 to 50 μm. The growth ratio is usually in the range of from 5 to 10 times, more preferably approximately 7 times, in the particle diameter.

Solvent metals customarily used for the synthesis of diamond, for example, metals of the group VIII of the Periodic Table, such as iron, cobalt, and nickel, and chromium and tantalum, may be used as the solvent metal in the present invention.

To control the solubility of the solvent metal into nondiamond carbon, control the contact of the diamond seed particles with nondiamond carbon, and prevent the inclusion of oxygen or nitrogen in the diamond, an appropriate metal other than the solvent metal or an appropriate compound may be added as a stabilizer in an amount of up to about 50% by weight based on the weight of the solvent metal. As the metal or compound, there can be mentioned Mg, Ca, Ti, Zr, V, Nb, Zn, Y, Mo, W, Cu, Au, Ag, Si, B, Al, Ge, In, Sn, Pb, and their carbides and borides.

A nondiamond carbon customarily used for the synthesis of diamonds, such as graphite, may be used as the nondiamond carbon to be converted to diamond.

The pressure and temperature conditions in the diamond stable-region, under which the diamond crystals are allowed to grow, involve usually a temperature of from 1300° to 1900° C. and a pressure of from 40 to 70 kbar. The crystal growth period is usually from about 10 to about 60 minutes.

In the above-mentioned reaction system, if the number of seed particles is determined in such a manner that the total growth amount of diamond expected to be formed by the reaction is in agreement with the product of the desired average growth amount per seed particle and the number of seed particles, the aimed particle size distribution of the diamond can be narrowed. To systematically determine the total growth amount of diamond expected to be formed, it is better to carry out the synthesis of diamond under various final loads and determine the growth amounts. If the final load is increased within a range allowable for the synthesis apparatus, the amount of diamond formed can be increased. However, if the seed density is too high, the grown particles interfere with one another. As a means for effectively narrowing the particle size distribution, there can be mentioned a method in which the distances of the adjacent seeds in the horizontal and vertical directions and the particle size of seeds are varied while taking the temperature or pressure distribution in the reaction zone into consideration.

The kinds of the nondiamond carbon and solvent metal are not particularly critical in the present invention, but the present invention is especially effective for a reaction system in which the crystal-growing speed is low.

The present invention will now be described in detail with reference to the following examples that by no means limit the scope of the invention.

EXAMPLE 1

Plates of an alloy of Fe70-Ni30 having a diameter of 28.6 mm and a thickness of 0.25 mm and graphite plates having a diameter of 28.6 mm and a thickness of 1.6 mm were superimposed alternately upon another in an agalmatolite vessel having an inner diameter of 28.6 mm and a height of 38 mm. In each alloy sheet, holes having a diameter of 0.1 mm and a depth of 0.1 mm were made by photoetching, in such a manner that the distances between the centers of every two adjacent holes were 0.6 mm. One diamond particle having a size of 35 to 40 μm was placed in each hole. Both the upper and lower ends of the resulting pile were covered with graphite plates to attain a heat-insulating effect and capped with iron lids. The pile was placed in a belt-type super-high pressure synthesis apparatus. The pile was compressed and electricity was applied to the reaction zone to directly heat the compressed pile. Reaction was carried out by raising the pressure to 50 Kbar, elevating the temperature to 1450° C., and then raising the pressure to 57 Kbar over a period of 20 minutes.

As the result, about 5 g of diamond was obtained, and the particle size was concentrated to the range of from 300 to 425 μm in 40% of the formed crystals. The ratio of the formation of satisfactory crystals was high, being about two times the ratio of the formation of satisfactory crystals obtained by the conventional method in which the same amount of seeds were distributed in a mixture of graphite and the solvent alloy metal.

EXAMPLE 2

A minute amount of a quick-dry adhesive (marketed under the tradename of "Araldite") was spot-applied on the same alloy plates as used in Example 1, in such a manner that the distances between the centers of every two adjacent spots were 0.6 mm. Diamond particles having a size of 30 to 40 μm and having an Ni coating with a thickness of 30 μm were bonded to the alloy plates through the adhesive spots. Other procedures and conditions remained the same as described in Example 1. The obtained results were substantially the same as those obtained in Example 1. Incidentally, when a large amount of adhesive was used, the formed crystals exhibited a poor transparency.

EXAMPLE 3

Diamond crystals were grown in the same manner as described in Example 1 except that holes were made in the graphite plates and seed particles were placed therein. Other procedures and conditions remained substantially the same. The obtained results were substantially the same as those obtained in Example 1, except that the size of the crystals was relatively small.

EXAMPLE 4

The particle size of 300 to 425 μm was aimed at in the reaction system of Example 1, and the number of seed particles was determined so that it would match the estimated yield in this reaction system, that is, 8 g. To dispose all of the seed particles, the thickness of the alloy plates and graphite plates were varied to 0.25 mm and 1.0 mm, respectively. The distances between two adjacent holes for placing the seed particles therein were reduced to 0.5 mm. The synthesis operation was carried out in the same manner as in Example 1. Crystals were obtained in an amount of 7.6 g, and the yield of crystals having a size of 300 to 425 μm was about 50%. The ratio of the formation of satisfactory crystals was more than two times the ratio of formation of satisfactory crystals obtained by the conventional method wherein a plate molded from a mixture of diamond seeds, a graphite powder, and an Fe70-Ni30 alloy powder is used.

COMPARATIVE EXAMPLE 1

Diamond crystals were grown in the same manner as described in Example 1 except that holes having a diameter of 0.3 mm were made in each alloy sheet and diamond seed particles having a size of 150 to 200 μm were used. All other conditions remained substantially the same.

As a result, 6 g of diamond was obtained, and the particle size was concentrated to the range of from 300 to 425 μm in 40% of the formed crystals.

Abrasive Grain Strength Test

The abrasive grain strength of the diamond crystals obtained in Examples 1 through 4 and Comparative Example 1 was tested. This test was conducted by measuring the single grain crushing strength of the as-grown crystals and that of the crystals after calcination at 1000° C. in a nitrogen atmosphere for one hour. The results are shown in Table 1 (each datum given is an average value of 50 grain specimens).

TABLE 1

|  | Before calcination (kg) | After calcination (kg) |
| --- | --- | --- |
| Example 1 | 27 | 21 |
| Example 2 | 24 | 21 |
| Example 3 | 26 | 22 |
| Example 4 | 22 | 20 |
| Comparative Example 1 | 21 | 12 |

As is apparent from Table 1, the crystals of Comparative Example 1 (wherein seeds of a large particle size were used and the crystals were grown at a small growth ratio) exhibit poor thermal shock resistance.

Abrasive Cut Off Test

A thin sheet was prepared by pressing using a hot press and sintering a mixture of a diamond crystal particle and a cobalt powder (20:80 by weight). The sheet was cut into strips. Each strip was adhered to the periphery of a disc having a diameter of 350 mm made of an iron-based metal to obtain a cut-off wheel. Using this cut-off wheel, the abrasive cut off test was conducted under the following conditions.

Type of procedure: wet
Stone to be cut off: white granite
Peripheral speed of cut-off wheel: 1600 m/min.
Feed rate of cut-off wheel: 3 m/min.
Depth setting: 7 mm/pass Attrition wear of the cut-off wheel (expressed in terms of diameter decrease in mm per m² of the cut area) and abrasive stability (variation of power requirements) are shown in Table 2.

TABLE 2

| Diamond Crystal | Attrition wear (mm/m$^2$) | Abrasive stability |
| --- | --- | --- |
| Example 1 | 0.52 | Good |
| Comparative Example 1 | 1.30 | Poor |

We claim:

1. An improvement in a method for growing diamond crystals which comprises subjecting reaction materials of nondiamond carbon, a solvent metal, and diamond particles as the seeds, to pressure and temperature conditions in the diamond-stable region, wherein the reaction materials are in the form of a pair of a superimposed solvent metal plate and a nondiamond carbon plate or a pile made of a plurality of said pairs of the superimposed solvent metal plate and nondiamond carbon plate, a plurality of the diamond particles being disposed on either one or each of the confronting surfaces of the pair of the superimposed solvent metal plate and nondiamond carbon plate; or the reaction materials are in the form of a plate made of a mixture of the solvent metal and the nondiamond carbon or a pile made of a plurality of the solvent metal/nondiamond carbon mixture plates, a plurality of the diamond particles being disposed on a surface of each solvent metal/nondiamond carbon mixture plate, said improvement comprising regularly disposing diamond particles having a particle size of not larger than 50 μm in such a manner that the diamond particles are located at a substantially equal distance and the distance between the peripheries of every two adjacent grown diamond crystal particles is in the range of 50 to 300 μm; and allowing the diamond crystals to grow until their sizes reach at least five times the size of the seed particles.

2. A method according to claim 1, wherein the diamond seed particles are placed one by one in a plurality of holes made in either one or each of the confronting surfaces of the pair of the superimposed solvent metal plate and nondiamond carbon plate, said holes being made at a substantially equal distance and at a distance such as will provide a distance of 50 to 300 μm between the peripheries of every two adjacent grown diamond crystal particle.

3. A method according to claim 2, wherein the plurality of holes are made in the solvent metal plate.

4. A method according to claim 2, wherein the diamond seed particles are plated with a metal.

5. A method according to claim 1, wherein the diamond particles as the seed have a particle size of from 10 to 50 μm.

6. A method according to claim 1, wherein the diamond crystals are allowed to grow until their sizes reach 5 to 10 times the size of the seed particles.

7. A method according to claim 1, wherein the nondiamond carbon is graphite.

8. A method according to claim 1, wherein the solvent metal is a metal selected from the group consisting of iron, cobalt, nickel, chromium and tantalum, and their alloys.

* * * * *